US006421080B1

United States Patent
Lambert

(10) Patent No.: US 6,421,080 B1
(45) Date of Patent: Jul. 16, 2002

(54) DIGITAL SURVEILLANCE SYSTEM WITH PRE-EVENT RECORDING

(75) Inventor: Tim A. Lambert, Lexington, KY (US)

(73) Assignee: Image Vault LLC, New Albany, IN (US)

( * ) Notice: Subject to any disclaimer, the term of this patent is extended or adjusted under 35 U.S.C. 154(b) by 0 days.

(21) Appl. No.: 09/435,175

(22) Filed: Nov. 5, 1999

(51) Int. Cl.⁷ .............................. H04N 7/18; H04N 9/47
(52) U.S. Cl. ....................................... 348/143
(58) Field of Search ................................ 348/143, 150, 348/151, 152, 153, 154, 155, 156, 159; H04N 7/18, 9/47

(56) References Cited

U.S. PATENT DOCUMENTS

| | | | |
|---|---|---|---|
| 4,257,063 A | * 3/1981 | Loughry et al. | ............ 348/155 |
| 5,491,511 A | 2/1996 | Odle | |
| 5,625,410 A | 4/1997 | Washino et al. | |
| 5,666,157 A | 9/1997 | Aviv | |
| 5,751,346 A | * 5/1998 | Dozier et al. | ................ 348/153 |
| 5,798,798 A | 8/1998 | Rector et al. | |
| 5,915,069 A | 6/1999 | Nishijima | |
| 5,916,300 A | * 6/1999 | Kirk et al. | ................... 701/213 |
| 5,948,094 A | * 9/1999 | Solomon et al. | ............ 710/118 |

OTHER PUBLICATIONS

Brochure "Digital Video Security Image Vault".
Brochure "Digital Video Recorder DVR 4004".
Brochure "Digital Video Recorder DVR 4008".
Brochure "Digital Video Recorder DRV 8004".
Brochure "Digital Video Recorder DRV 8008".

* cited by examiner

Primary Examiner—Nhon Diep
(74) Attorney, Agent, or Firm—Brooks & Kushman P.C.

(57) ABSTRACT

An image recording system and method for use with a surveillance system having at least two cameras provides true pre-event recording for multiple input sources to improve video on demand storage control. More specifically, an image recording subsystem is connected to the cameras for receiving generated video images, and storing the received images in a temporary storage device having a storage capacity large enough to store video images generated over a predetermined period of time. The image recording subsystem is arranged to continuously record video images into the temporary storage device such as a cache memory, and in response to the occurrence of a triggering event, subsequently record the temporarily stored video images into a long-term storage device for later retrieval. The image recording system is arranged to determine the occurrence of overlapping triggering events, and automatically "rewind" the sequential long term storage process so that any images associated with an earlier triggering event but occurring in time after a later triggering event that have already been stored to long term storage are properly reordered to occur after any earlier occurring images associated with the later triggering event.

19 Claims, 3 Drawing Sheets

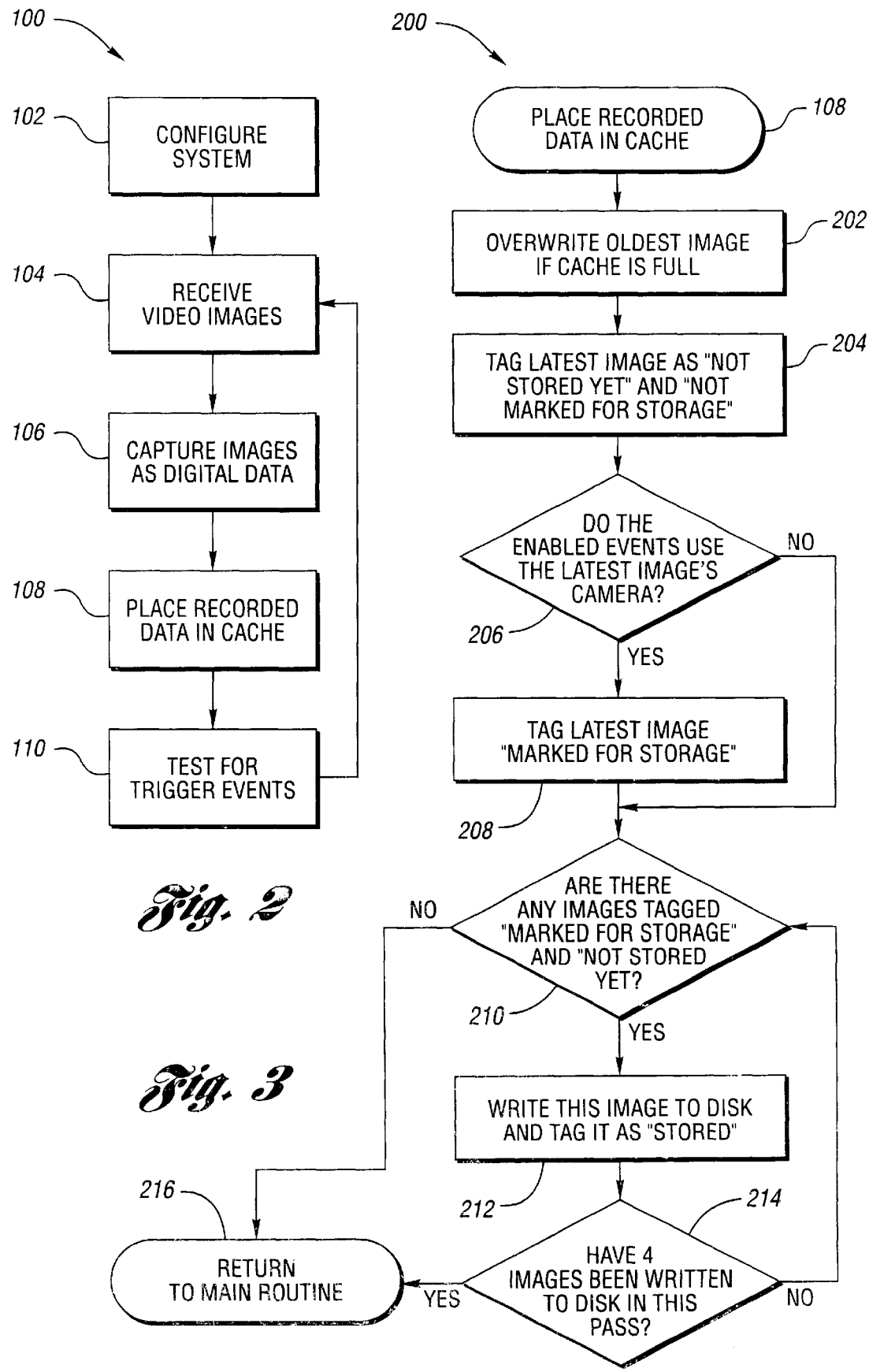

DIGITAL SURVEILLANCE SYSTEM WITH PRE-EVENT RECORDING

TECHNICAL FIELD

The present invention generally relates to surveillance systems which capture and store visual information generated by one or more surveillance cameras, and more particularly to an improved recording arrangement allowing such systems to be triggered by occurrence of a particular event while still recording the entire event.

BACKGROUND ART

Surveillance systems which record images from one or more video cameras or closed circuit televisions systems are well known in the art. These systems allow time sequential visual records to be stored as analog signals on videotape or digital images in a personal computer (PC) memory device for later review and analysis. A common problem for all such systems is balancing the availability of a finite amount of physical space for storage of captured signals with the potentially large amount of information which may need to be recorded in carrying out continual surveillance over long periods of time. One known approach for addressing this problem involves only activating image recording in response to specific triggering events, such as opening of a door, operation of a cash register or ATM, or tripping of a sensor. By triggering recording only when particular events occur, such arrangements not only significantly reduce the amount of video information to be recorded, but also assure the images that are stored have the highest probability of being of interest.

While such event triggered systems effectively eliminate the need for large information storage space, the requirement that recording does not begin until after occurrence of one of the events insures that the period of time just preceding the event will never be recorded. Unfortunately, it is this preceding period of time which tends to be of greatest interest when later analyzing the recorded information. Therefore, a need exists for an improved surveillance system capable of reducing the need for the large storage space without reducing the system's capability to record information likely to be the most useful.

DISCLOSURE OF INVENTION

Therefore, it is an object of the present invention to provide a surveillance and image capture system and method which overcomes the above-noted problems by constantly recording surveillance information into temporary and reusable storage, and recording such information for long-term storage and subsequent retrieval upon the occurrence of multiple and overlapping predefined triggering events.

It is another object of the present invention to provide a digital image recording arrangement for use in a surveillance system which continuously records digital image data from multiple video sources into a cache memory to create a pre-event image data store, and subsequently stores the pre-event digital image data in proper time sequential order from each of the multiple video sources into long-term data storage for later retrieval and analysis upon the occurrence of one or more overlapping triggering events from any one or all of the video sources.

It is yet another object of the present invention to provide a digital image recording arrangement for use in a surveillance system which is capable of true pre-event image recording for systems having multiple image input sources.

In accordance with these and other objects of the present invention, pre-event recording is achieved by providing an image recording system for use with a surveillance system having at least two cameras, wherein the recording system includes a processor connected to the at least two video cameras for receiving generated video images and image creation time identifying information, a temporary storage device connected to the processor and having a storage capacity large enough to store video images generated over a predetermined period of time, a long-term storage device also connected to the processor, and a sensor arrangement for detecting an occurrence of a pre-defined triggering event associated with each camera. The processor is arranged to continuously record video images from each camera into the temporary storage device, and in response to the sensor arrangement detecting the occurrence of a triggering event associated with any of the at least two cameras, subsequently record temporarily stored video images generated by the associated camera into the long term storage device.

In accordance with one aspect of the present invention, the sensor arrangement is arranged to detect an occurrence of overlapping pre-defined triggering events, and the image recording processor is further arranged to subsequently record the temporarily stored video images generated by each camera associated with the detected triggering events into the long-term storage device. The image recording processor is further arranged to detect that images from an earlier triggering event but occurring after a starting time for a later triggering event have been recorded into the long-term storage device, and in response, automatically altering the sequence of images recorded to the long-term storage device to place the images associated with each overlapping triggering event in a combined oldest to latest time sequence.

In accordance with another aspect of the present invention, a method for recording video images in a surveillance system having at least two cameras includes receiving video images generated by the at least two video cameras and determining an image creation time for each received image, and recording the received video images in a temporary storage device having a storage capacity large enough to store video images generated over a predetermined period of time. Upon detecting an occurrence of a pre-defined triggering event associated with one of the cameras, the temporarily stored video images generated by the associated camera into a long-term storage device while continuing to maintain any images recorded in the temporary storage device generated by any camera not associated with triggering event.

In accordance with still another aspect of the present invention, the method detects an occurrence of overlapping pre-defined triggering events associated with different cameras, and in response to each triggering event, subsequently records temporarily stored video images generated by each camera associated with the detected triggering events into a long-term storage device. In addition, upon detecting that images from an earlier triggering event but occurring after a starting time for a later occurring triggering event have been recorded into the long-term storage device, the sequence of images recorded to the long-term storage device is automatically altered to place the images associated with each overlapping triggering event in a combined oldest to latest time sequence.

In accordance with other aspects of the present invention, the received video images are captured as digital image data and compressed before recording in the temporary storage device. The temporary storage device can be implemented as a cache memory, and the oldest video images in the temporary storage device are automatically overwritten when the storage capacity is filled.

Thus, the present invention provides a true pre-event recording arrangement for multiple video input sources that is further capable of handling the occurrence of overlapping triggering events by automatically "rewinding" the sequential long term storage process so that any images associated with an earlier triggering event but occurring in time after a later triggering event that have already been stored to long term storage are properly reordered to occur after any earlier occurring images associated with the later triggering event.

The above objects and other objects, features, and advantages of the present invention are readily apparent from the following detailed description of the best mode for carrying out the invention when taken in connection with the accompanying drawings.

BRIEF DESCRIPTION OF DRAWINGS

FIG. 2 is a flow chart illustrating a main processing loop for pre- event image recording in accordance with the present invention;

FIG. 3 is a flow chart illustrating a cache/digital image storage control subroutine in accordance with the present invention.

BEST MODE FOR CARRYING OUT THE INVENTION

Figure 1:
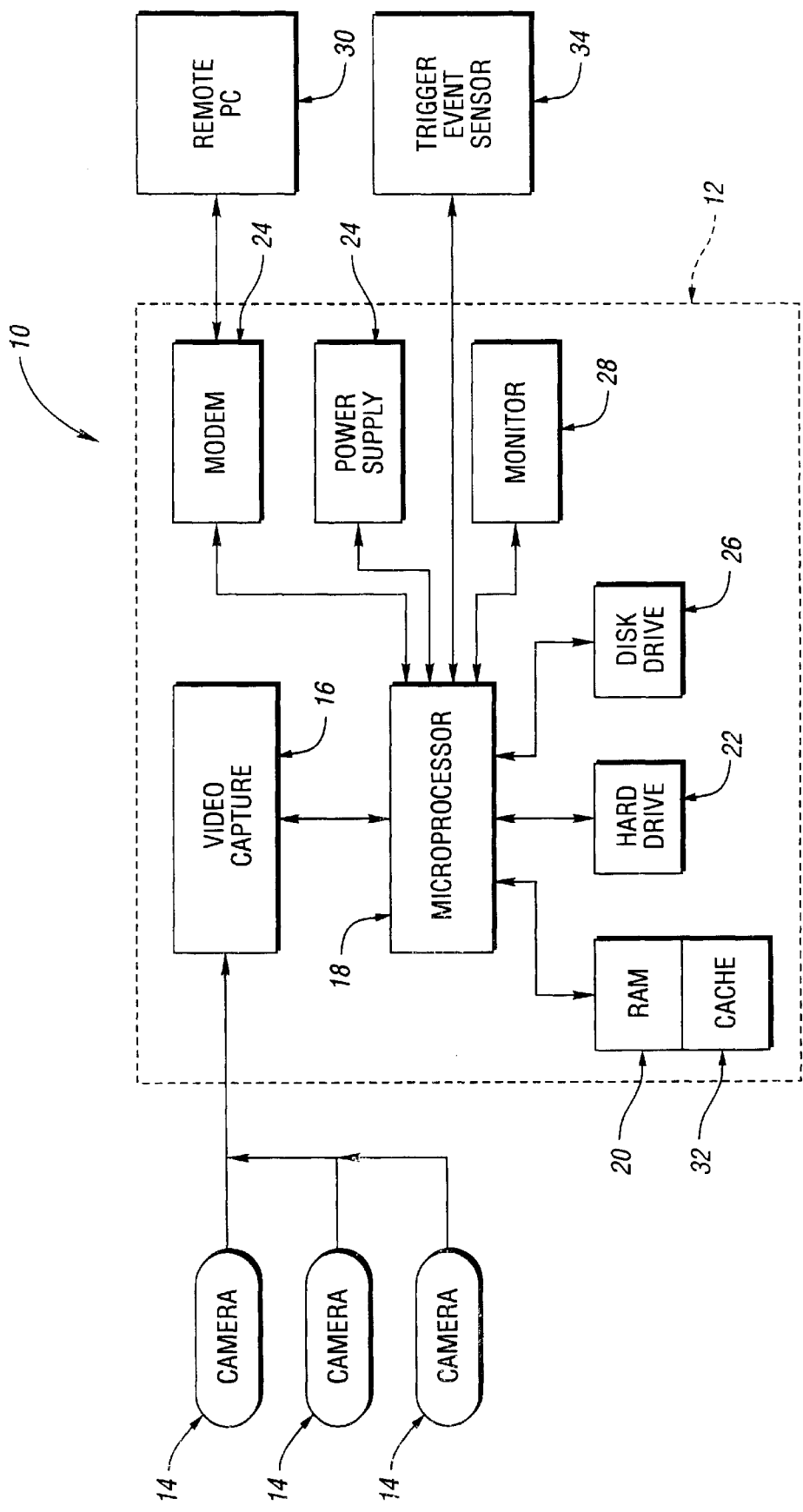
FIG. 1 is a block diagram of a surveillance and image recording system in accordance with the present invention.

FIG. 1 shows a block diagram of a surveillance system having a digital image recording system 10 in accordance with a preferred embodiment of the present invention. System 10 includes a recording subsystem 12 connected to at least two or more video cameras 14, such as CCTV cameras, which are positioned to provide video monitoring of a predetermined area. Recording subsystem 12 is typically installed on a customer's site in a nonconspicuous location. Recording subsystem 12 preferably includes a stand-alone personal computer (PC) configured with at least one video capture board 16, power supply (not shown), microprocessor 18, memory (RAM) 20, one or more hard drives 22, a modem 24, and disk drive 26. The modem allows remote access and control. In the embodiment shown, recording subsystem 12 operates as a digital replacement for analog video cassette recorders typically employed in CCTV systems. A monitor 28 is optional.

A remote monitoring subsystem 30 can be included and programmed to allow a user to directly access the recording subsystem from a remote location via modem 24. Such access programming preferably requires input of a correct phone number and password corresponding to subsystem 12 before allowing access to view stored images or configure the recording subsystem.

As described below, recording subsystem 12 is programmed to continually capture video images provided by each camera 14 as digital data. Captured image data is then compressed using suitable data compression techniques to reduce the size of the image data, such as to approximately one-twelfth the original size in an exemplary embodiment. The compressed image data is then temporarily stored as an image data file in a cache memory 32 preferably having space for storage of 60–400 images depending on the amount of RAM installed in subsystem 12. Suitable identifying information such as date and time of the original image, image size, and a camera identifier are stored with the compressed image data file or in a separate but related catalog data file.

More specifically, capture board 16 receives and converts an incoming video signal stream of pixel values that represent brightness and color. The capture board transfers the pixel values as image data to cache 32 in RAM memory 20 for temporary storage using direct memory access (DMA). The pixel values stored in cache are then transformed using Wavelet processing, and the transformation results compressed in accordance with a bit-encoding scheme. As described below, the compressed data can be selectively stored as a new image file in long-term storage on hard drive 22 and/or disk drive 26, or added to an existing stored image file. The stored image files allow video information recorded over pre-determined lengths of time to be organized and accumulated for later retrieval and analysis. Once an existing image file becomes completely filled, all corresponding catalog data is preferably appended to the same image file, and closed to any further recording. A new image file is subsequently opened in the system memory. Image data that is not recorded to long-term storage is ultimately written over by subsequent image data.

In accordance with the present invention, captured and compressed images are continually recorded into the temporary memory, and subsequently stored are selectively recorded into long-term storage only upon detecting a triggering event. Examples of triggering events include transactions at point-of-sale terminals and automated banking teller machines (ATM), output signals from motion sensors and security alarms, and a control signal sent by a remote computer system. Apparatus for detecting such events is well known to one having ordinary skill in the art. Suitable detecting apparatus is denoted as a sensor arrangement 34, and detects the occurrence of at least one of the above-identified events and provides a corresponding output signal for input to recording subsystem 12.

The image data stored in the temporary memory just prior to detection of a triggering event qualifies as pre-event activity, and will be copied to the long-term memory along with contemporaneously or post-event image data to advantageously provide an image record of events occurring just prior to a triggering event in combination with those generated after the triggering event. This allows the image recording arrangement of the present invention to reduce the amount of image data which needs to be stored without compromising the potential usefulness of the stored image record.

Figure 4:
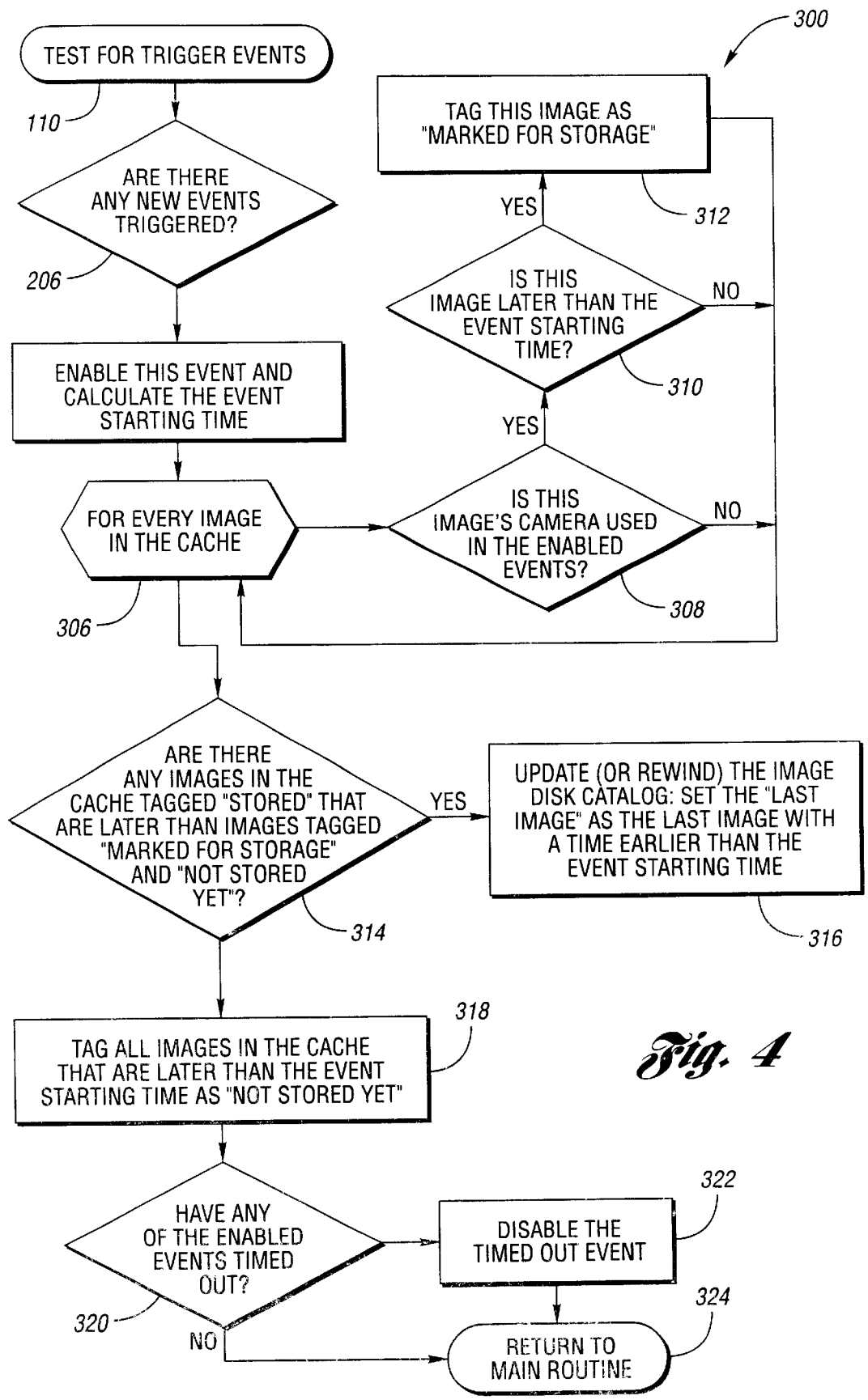
FIG. 4 is a flow chart illustrating an event triggering determination control subroutine in accordance with the present invention.

Overall operation of the image recording process of the present invention is illustrated in the flowcharts of FIGS. 2–4. More specifically, a main processing loop 100 is shown in FIG. 2, a cache and digital image storage control subroutine 200 is shown in FIG. 3, and an event triggering determination control subroutine 300 is shown in FIG. 4. In a preferred embodiment, programming for subsystem 12 includes an event manager arranged to maintain a list of triggering event inputs, and at least one user-configurable parameter associated with each event. For example, configurable parameters can include a list of cameras to be saved to long-term storage in association with the occurrence of specific types of events, the length of time preceding a triggering event from which pre-event image data is to be tagged and copied to long-term storage from the cache, and the length of time following a triggering event in which new image data will be copied from cache into long-term memory. Configuration of the system is generally denoted as being part of the main processing loop at block 102.

Video images are received from the plurality of cameras at block 104, and captured as digital image data and compressed at block 106. The compressed image data is then stored as temporary image data in cache 32 in accordance with subroutine 200 as denoted at block 108. The cache maintains a list of dynamic frames consisting of the compressed image data as well as the number of bytes in the compressed image, the date and time that the image was captured, and camera identification data indicating the camera from which the image was captured. As described below in conjunction with FIG. 3, after a predetermined number of images, e.g., four in a preferred embodiment, have been copied from the cache, the system then executes subroutine 300 to determine: (1) occurrence of any new triggering event, and (2) timing out of any old triggering events.

Referring now to FIG. 3, as indicated at block 202, system 12 automatically reuses the cache memory when storing data into the cache if the list of dynamic frames has become full. More specifically, system 12 is programmed to reuse the cache by overwriting the oldest dynamic frame with a new image file when the cache is full. As shown in block 204, the last image stored in the cache is tagged to indicate that the image has not yet been copied to disk, and has not yet been marked for storage. Then, at block 206, a determination is made as to whether any ongoing enabled or triggering events use the camera that the generated the latest image. If so, the image is tagged "marked for storage" at block 208. Otherwise, the process proceeds to block 210 and determines on an image by image basis whether there are currently any images stored in the cache that have been "marked for storage" but not yet stored to disk. If such an image is found, the image is then copied or written to disk, and the image file in the cache is tagged as "stored" as denoted at block 212. As shown at block 214, the preferred embodiment is arranged to process and write to disk four images through each pass of the subroutine 200. However, this is not to be construed as limiting as more or less image files can be processed in any given cycle. It is further noted that none of the images in the cache are removed from cache when written to disk. The images are only copied to a disk when marked for storage. The images in the cache are only removed as a result of the above-described cache reuse arrangement. The process then returns to main processing loop 100 as shown at block 216.

Referring now to FIG. 4, as indicated at block 302, system 12 determines if any new triggering events have occurred since the last cycle. If there is a new triggering event, the event is enabled and the event starting time is determined at block 304. Recording subsystem 12 is programmed to calculate a starting time as being equal to the current time minus the amount of time already stored as part of the pre-event recording associated with this event. The process then proceeds to a subloop 306 and determines for every image in the cache whether the image was produced by the camera(s) associated with the new triggering event as shown at block 308. If the image being processed was not generated by a camera associated with the triggering event, the process returns to block 306 and processes the next image. Otherwise, as indicated at block 310, the process determines whether the image is later in time than the event starting time, and if later, tags the image for storage to the disk as indicated at block 312. Otherwise, the process return to block 306.

Once all the images have been analyzed, the process proceeds to block 314 to determine if there are any images in the cache that have been tagged "stored" to disk but are later in time than images that have been tagged "marked for storage" but have not yet been copied to disk. If there are later stored images, then as denoted at block 316, the last image residing in the long term storage, i.e., the disk, is reset or "rewound" to correspond to the last image with a time earlier than the event starting time. After this step is completed, or if there are no later images already stored to disk, all images in the cache that are later than the event starting time are tagged to indicate that they have not yet been stored to disk as indicated at block 318. Thus, by this process, all later occurring images that have already been written to disk will be written over with earlier occurring images, and then subsequently copied again from cache in their proper sequential order. Implicit in the operation of blocks 310/314 is that the long-term storage can not be rewound back to a point in time earlier then the oldest image still residing in cache. Otherwise, later occurring images that have already been written over in cache could not be rewritten to disk.

At the end of this process, or if there were no new triggering events as determined at block 302, the process jumps to block 320 to determine if any of on-going events have timed-out. If so, the timed-out event(s) are disabled at block 322. The process then returns to the main processing loop as indicated at block 324.

The following is an example of video image transfer control from the cache during overlapping triggering events from different cameras in accordance with the present invention. As shown in each of the five tables, the cache includes 20 entries for storing the latest images captured from a camera 1 and a camera 2 in a continuous alternating one second sampling interval. Thus, if a first triggering event occurs at 25 seconds, the cache will contain the following entries:

TABLE 1

| Cache Entry | Camera ID | Marked for Storage | Stored Yet | Time (Seconds) |
|---|---|---|---|---|
| 1 | 1 | | | 25 |
| 2 | 2 | | | 24 |
| 3 | 1 | | | 23 |
| 4 | 2 | | | 22 |
| 5 | 1 | | | 21 |
| 6 | 2 | | | 20 |
| 7 | 1 | | | 19 |
| 8 | 2 | | | 18 |
| 9 | 1 | | | 17 |
| 10 | 2 | | | 16 |
| 11 | 1 | | | 15 |
| 12 | 2 | | | 14 |
| 13 | 1 | | | 13 |
| 14 | 2 | | | 12 |
| 15 | 1 | | | 11 |
| 16 | 2 | | | 10 |
| 17 | 1 | | | 9 |
| 18 | 2 | | | 8 |
| 19 | 1 | | | 7 |
| 20 | 2 | | | 6 |

If the predetermined parameters call for storage of 15 seconds of pre-event for camera 1, after the first event is processed the cache entries will be modified as follows:

TABLE 2

| Cache Entry | Camera ID | Marked for Storage | Stored Yet | Time (Seconds) |
|---|---|---|---|---|
| 1 | 1 | Y | | 25 |
| 2 | 2 | | | 24 |
| 3 | 1 | Y | | 23 |
| 4 | 2 | | | 22 |
| 5 | 1 | Y | | 21 |
| 6 | 2 | | | 20 |
| 7 | 1 | Y | | 19 |
| 8 | 2 | | | 18 |
| 9 | 1 | Y | | 17 |
| 10 | 2 | | | 16 |
| 11 | 1 | Y | | 15 |
| 12 | 2 | | | 14 |
| 13 | 1 | Y | | 13 |
| 14 | 2 | | | 12 |
| 15 | 1 | Y | | 11 |
| 16 | 2 | | | 10 |
| 17 | 1 | | | 9 |
| 18 | 2 | | | 9 |
| 19 | 1 | | | 7 |
| 20 | 2 | | | 6 |

If a second triggering event is detected at 30 seconds, the cache entries will have been modified as follows at the time of the second event (note that the marked images have been tagged as already being written to disk/long term storage):

TABLE 3

| Cache Entry | Camera ID | Marked for Storage | Stored Yet | Time (Seconds) |
|---|---|---|---|---|
| 1 | 2 | | | 30 |
| 2 | 1 | | | 29 |
| 3 | 2 | | | 28 |
| 4 | 1 | | | 27 |
| 5 | 2 | | | 26 |
| 6 | 1 | Y | Y | 25 |
| 7 | 2 | | | 24 |
| 8 | 1 | Y | Y | 23 |
| 9 | 2 | | | 22 |
| 10 | 1 | Y | Y | 21 |
| 11 | 2 | | | 20 |
| 12 | 1 | Y | Y | 19 |
| 13 | 2 | | | 18 |
| 14 | 1 | Y | Y | 17 |
| 15 | 2 | | | 16 |
| 16 | 1 | Y | Y | 15 |
| 17 | 2 | | | 14 |
| 18 | 1 | Y | Y | 13 |
| 19 | 2 | | | 12 |
| 20 | 1 | Y | Y | 11 |

The parameters for the second event call for recording of 15 seconds of Pre-Event on camera 2. Thus, after the second event is processed, the cache entries will have been modified as follows:

TABLE 4

| Cache Entry | Camera ID | Marked for Storage | Stored Yet | Time (Seconds) |
|---|---|---|---|---|
| 1 | 2 | Y | | 30 |
| 2 | 1 | | | 29 |
| 3 | 2 | Y | | 28 |
| 4 | 1 | | | 27 |
| 5 | 2 | Y | | 26 |
| 6 | 1 | Y | Y | 25 |
| 7 | 2 | Y | | 24 |
| 8 | 1 | Y | Y | 23 |
| 9 | 2 | Y | | 22 |
| 10 | 1 | Y | Y | 21 |
| 11 | 2 | Y | | 20 |
| 12 | 1 | Y | Y | 19 |
| 13 | 2 | Y | | 18 |
| 14 | 1 | Y | Y | 17 |
| 15 | 2 | Y | | 16 |
| 16 | 1 | Y | Y | 15 |
| 17 | 2 | | | 14 |
| 18 | 1 | Y | Y | 13 |
| 19 | 2 | | | 12 |
| 20 | 1 | Y | Y | 11 |

As is evident from Table 4, the images from camera 2 captured between 16 seconds and 24 seconds will be written to the disk out of sequence. Therefore, in accordance with the present invention, the image catalog on the disk is backed up such that the last image will now be at 15 seconds, and the images in the cache later the 15 second entry are marked as "Not Yet Stored" as follows:

TABLE 5

| Cache Entry | Camera ID | Marked for Storage | Stored Yet | Time (Seconds) |
|---|---|---|---|---|
| 1 | 2 | Y | | 30 |
| 2 | 1 | | | 29 |
| 3 | 2 | Y | | 28 |
| 4 | 1 | | | 27 |
| 5 | 2 | Y | | 26 |
| 6 | 1 | Y | | 25 |
| 7 | 2 | Y | | 24 |
| 8 | 1 | Y | | 23 |
| 9 | 2 | Y | | 22 |
| 10 | 1 | Y | | 21 |
| 11 | 2 | Y | | 20 |
| 12 | 1 | Y | | 19 |
| 13 | 2 | Y | | 18 |
| 14 | 1 | Y | | 17 |
| 15 | 2 | Y | | 16 |
| 16 | 1 | Y | | 15 |
| 17 | 2 | | | 14 |
| 18 | 1 | Y | Y | 13 |
| 19 | 2 | | | 12 |
| 20 | 1 | Y | Y | 11 |

Now, the next few passes through the Cache will write images at 16, 17, 18, 19, 20, 21, 22, 23, 24, 25, 26, 28, 30 seconds to the disk.

Thus, the present invention provides a system that allows true pre-event recording for multiple video input sources by insuring that images that have been temporarily stored in the cache are maintained (unless a particular image is the oldest stored and the cache is full) in the cache even though a triggering event associated with one of the cameras has been detected. In addition, the ability to detect overlapping triggering events and subsequently "rewind" already stored but later occurring pre-event images allows the present invention to insure that images recorded to long-term storage are kept in proper time sequence.

While an embodiment of the invention have been illustrated and described, it is not intended that these embodiments illustrate and describe all possible forms of the invention. For example, while the present invention has been described in context with a digital image store arrangement, the pre-event storage process can be readily adapted for use with an analog image recording system. Therefore, the words used in the specification are words of description rather than limitation, and it is understood that various changes may be made without departing from the spirit and scope of the invention.

What is claimed is:

1. An image recording system for use with a surveillance system having at least two cameras comprising:
an image recording processor connected to the at least two video cameras for receiving generated video images and image creation time identifying information;
a temporary storage device connected to the image recording processor and having a storage capacity large enough to store video images generated over a predetermined period of time;
a long-term storage device connected to the image recording processor; and
a sensor arrangement for detecting an occurrence of a pre-defined triggering event associated with each camera, wherein the image recording processor is arranged to continuously record video images from each camera into the temporary storage device, and in response to the sensor arrangement detecting the occurrence of a triggering event associated with any of the at least two cameras, subsequently recording temporarily stored pre-event video images generated over a predetermined period of pre-event time by the associated camera into the long-term storage device.

2. An image recording system for use with a surveillance system having at least two cameras comprising:
an image recording processor connected to the at least two video cameras for receiving generated video images and image creation time identifying information;
a temporary storage device connected to the image recording processor and having a storage capacity large enough to store video images generated over a predetermined period of time;
a long-term storage device connected to the image recording processor; and
a sensor arrangement for detecting an occurrence of a pre-defined triggering event associated with each camera, wherein the image recording processor is arranged to continuously record video images from each camera into the temporary storage device, and in response to the sensor arrangement detecting the occurrence of a triggering event associated with any of the at least two cameras, subsequently recording temporarily stored video images generated by the associated camera into the long-term storage device,
wherein the sensor arrangement is arranged to detect an occurrence of overlapping pre-defined triggering events associated with different cameras, and the image recording processor is further arranged to subsequently record the temporarily stored video images generated by each camera associated with the detected triggering events into the long-term storage device, said image recording processor being further arranged to detect that images from an earlier triggering event but occurring after a starting time for a later triggering event have been recorded into the long-term storage device, and in response, automatically altering the sequence of images recorded to the long-term storage device to place the images associated with each overlapping triggering event in a combined oldest to latest time sequence.

3. The image recording system of claim 1 wherein the image recording processor is further arranged to determine an event starting time for each triggering event as being equal to a current time minus the predetermined period of pre-event time, and tag for recording to the long-term storage device any video image recorded in the temporary storage device having a creation time after the event starting time.

4. The image recording system of claim 1 wherein the temporary storage device comprises a cache memory.

5. The image recording system of claim 1 wherein the long term storage device comprises a disk data storage device.

6. The image recording system of claim 1 wherein the image recording processor comprises a video capture arrangement for capturing the received video images as digital image data.

7. The image recording system of claim 6 wherein the image recording processor is further arranged to compress the digital image data before recording in the temporary storage device.

8. The image recording system of claim 1 wherein the image recording processor is further arranged to determine the oldest video image stored in the temporary storage device based on the creation time identifying information, and automatically overwrite the oldest video image if the temporary storage device becomes filled.

9. A method for pre-event recording video images in a surveillance system having at least two cameras comprising:
receiving video images generated by the at least two video cameras and determining an image creation time for each received image;
recording the received video images in a temporary storage device having a storage capacity large enough to store video images generated over a predetermined period of time;
detecting an occurrence of a pre-defined triggering event associated with one of the cameras; and
in response to detecting the occurrence of the triggering event, subsequently recording temporarily stored pre-event video images generated over a predetermined period of pre-event time by the associated camera into a long-term storage device while continuing to maintain any images recorded in the temporary storage device generated by any camera not associated with triggering event.

10. A method for pre-event recording video images in a surveillance system having at least two cameras comprising:
receiving video images generated by the at least two video cameras and determining an image creation time for each received image;
recording the received video images in a temporary storage device having a storage capacity large enough to store video images generated over a predetermined period of time;
detecting an occurrence of a pre-defined triggering event associated with one of the cameras;
in response to detecting the occurrence of the triggering event, subsequently recording temporarily stored video images generated by the associated camera into a long-term storage device while continuing to maintain any images recorded in the temporary storage device generated by any camera not associated with triggering event;
detecting an occurrence of overlapping pre-defined triggering events associated with different cameras;
in response to each triggering event, subsequently recording temporarily stored video images generated by each camera associated with the detected triggering events into a long-term storage device;

detecting that images from an earlier triggering event but occurring after a starting time for a later occurring triggering event have been recorded into the long-term storage device; and in response, automatically altering the sequence of images recorded to the long-term storage device to place the images associated with each overlapping triggering event in a combined oldest to latest time sequence.

11. The method of claim 10 wherein detecting overlapping triggering events comprises detecting a new triggering event while long term recording for an earlier triggering event is enabled, and calculating a new starting time as being equal to the current time minus the amount of time already stored as part of the pre-event recording associated with this event.

12. The method of claim 11 further comprising analyzing each image stored in the temporary storage device and tagging for long-term storage any images associated with either event having a creation time occurring after the new starting time.

13. The method of claim 12 further comprising:

determining if any images in the cache that have been tagged for long-term storage have a later creation time than images that have been tagged for storage but have not yet been recorded to the long-term storage device;

setting the last image for recording in the long-term storage device to correspond to the last image with a time earlier than the new starting time; and tagging all images stored in the temporary storage device that have a creation later than the new starting to indicate that the images have not yet been recorded to long-term storage.

14. The method of claim 9 further comprising determining an event starting time equal to a current time minus the predetermined period of pre-event time in response to detection of a triggering event, and tagging for recording in the long-term storage device any video image recorded in the temporary storage device having a creation time after the event starting time.

15. The method of claim 9 wherein recording the video images into a temporary storage device comprises storing the video images as image data in a cache memory.

16. The method of claim 9 wherein recording the temporarily stored video images into long-term storage comprises storing the video images as data in a disk data storage device.

17. The method of claim 9 further comprising capturing the received video images as digital image data.

18. The method of claim 17 further comprising compressing the digital image data before recording in the temporary storage device.

19. The method of claim 9 further comprising determining an oldest video image stored in the temporary storage device based on the creation time, and automatically overwriting the oldest video image if the temporary storage device becomes filled.

* * * * *